(No Model.)
P. SMITH.
AQUARIUM.
No. 597,249. Patented Jan. 11, 1898.
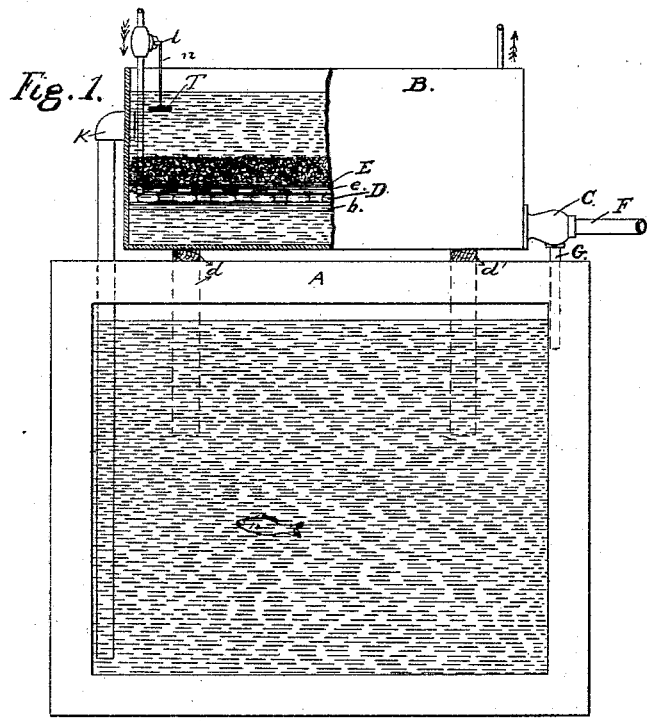
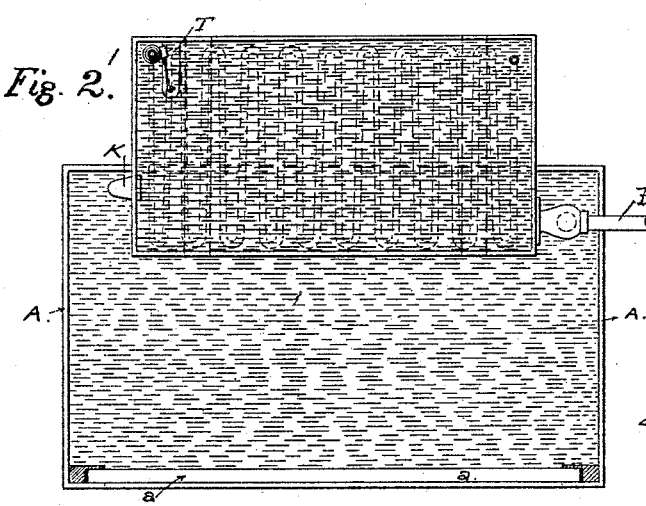
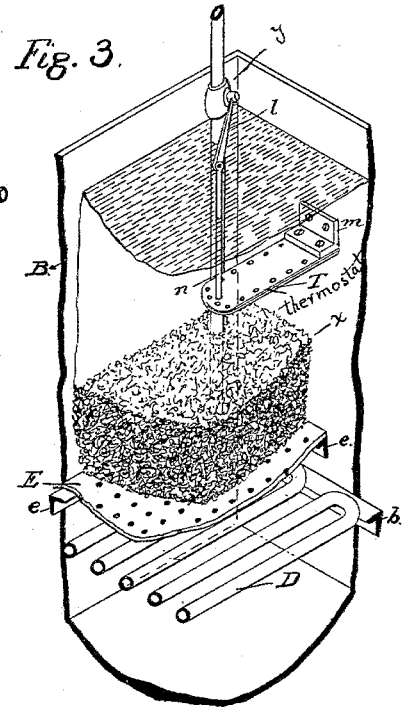
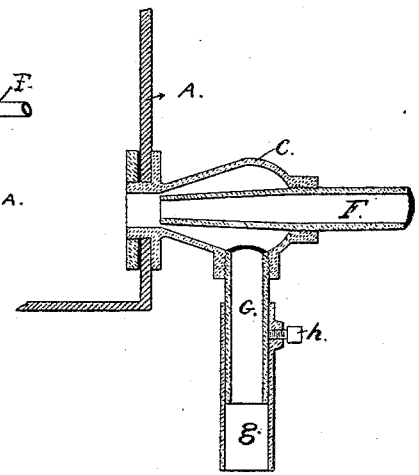
WITNESSES:
Patrick McInerney
Ferdinand H. Crok
INVENTOR
Peter Smith
BY Charles R. Searle
ATTORNEY

UNITED STATES PATENT OFFICE.

PETER SMITH, OF NEW YORK, N. Y.

AQUARIUM.

SPECIFICATION forming part of Letters Patent No. 597,249, dated January 11, 1898.

Application filed April 1, 1897. Serial No. 630,266. (No model.)

*To all whom it may concern:*

Be it known that I, PETER SMITH, a citizen of the United States, residing in New York city, in the county and State of New York, have invented a certain new and useful Improvement in Aquariums, of which the following is a specification.

The invention relates to aquariums in which the same water is used continuously, being reoxygenated and purified when it has become foul.

In the most complete form of the invention I employ an injector actuated by compressed air, which raises the water from the exhibiting-tank and forces it in an atomized condition intimately mingled with the air into the auxiliary tank below a diaphragm of filtering material. The space below the diaphragm is traversed by a coil of pipe maintaining the desired temperature and controlled by a thermostat. The flow of water is regulated by increasing or lessening the immersion of the suction-pipe leading from the exhibiting-tank to the injector. The operation is continuous, practically automatic, clean clear water at the proper temperature is insured, and the accumulation of air-bubbles on the surface of the water and walls of the exhibiting-tank is avoided.

The accompanying drawings form a part of this specification and represent what I consider the best means of carrying out the invention.

Figure 1 is a front elevation of the exhibiting-tank and auxiliary-tank. The latter is shown partly in vertical section. Fig. 2 is a plan view. Fig. 3 is a perspective view showing a portion of the auxiliary tank on a larger scale. Fig. 4 is a vertical section of the injector and immediately-adjacent parts.

Similar letters of reference indicate the same parts in all the figures.

A is the exhibiting-tank or aquarium proper, having the glass front $a$, through which the contained specimens may be viewed.

B is the auxiliary tank, located above the tank A and supported on the cross-arms or brackets $d$ $d'$. It is connected to the exhibiting-tank through the suction-pipe G and injector C and the delivery-pipe K, extending from the upper portion of the tank B nearly to the bottom of the tank A.

The auxiliary tank is divided into two compartments by the horizontal plate E, perforated, as shown, and resting on the angle-irons $e$, fastened to the walls, it supports the thick layer $x$ of filtering material. Below the plate E lies the temperature-coil D, carried on angle-irons $b$, similar to $e$, through which hot or cold water may be circulated to impart the desired temperature to the water in the aquarium.

T is a thermostat composed, as usual, of two plates of metal of differing expansion fastened together and to the bracket $m$, so arranged as to deflect upward or downward as the temperature of the water in which it is submerged rises or lowers. The motion is communicated through the link $n$ and lever $l$ to the valve $y$, controlling the flow of cooling or warming medium in the coil D.

The injector C is similar in construction and operation to those ordinarily employed with steam-pressure to transfer water. Instead of steam the injector here shown is intended to serve with air under pressure received through the pipe F from a blower or other source. (Not shown.) The suction-pipe G extends downwardly below the normal water-line in the tank A and is provided with the sleeve $g$, sliding telescopically thereon, thereby determining the depth at which the open lower end shall be submerged and is held at the required position by the set-screw $h$.

The operation of the apparatus is as follows: Assuming the conditions in both tanks to be as shown in Fig. 1, compressed air is led through the pipe F to the injector C and is projected into the lower portion of the tank B with sufficient force to draw up a volume of water from the tank A, which when struck by the air-jet is atomized and enters the tank B in the form of fine spray intimately mingled with the air. The watery particles join the volume of water in the tank B and the air escapes at the surface, having during its transit restored to the water with which it was mixed the necessary amount of oxygen. The water rises in the tank B, passing the temperature-coil D and plate E and through the layer $x$ of filtering materal, in which it leaves any solid matter held in suspension. The water thus filtered, reoxygenated, and tempered flows downward through the pipe K and is again delivered at a low level in the tank A. The operation continues indefinitely.

The temperature is automatically governed by the thermostat T, and by properly adjusting the relation of the sleeve $g$ to the normal water-line in the tank A, so that the level shall sink below the mouth of the sleeve before sufficient water has been transferred to fill the tank B, all danger of overflow is avoided for the reason that no more water will be drawn up until a sufficient quantity has again descended and raised the level.

Modifications may be made in the forms and proportions within wide limits without departing from the principle of the invention or sacrificing its advantages. Parts of the invention can be used without the whole.

I may dispense in some cases with the heating-coil and its thermostat, or the filter may be omitted, depending on the nature of the fish and plants contained in the tank and on the quality and other conditions of the water-supply.

Instead of the injector shown other forms may be employed, or the water may be lifted by other means and air or oxygen introduced directly to the tank B to reoxygenate the water before it again descends to the lower tank A. I prefer the whole as shown.

I claim—

1. In an aquarium, an exhibiting-tank and an auxiliary tank, an injector adapted to draw water from the exhibiting-tank and force it in an atomized condition mingled with air into said auxiliary tank, and a delivery-pipe leading the water thus reoxygenated from the latter to the said exhibiting-tank to be again used, all combined and arranged to serve substantially as herein specified.

2. In an aquarium, an exhibiting-tank and an auxiliary tank, an injector adapted to draw water from the exhibiting-tank and force it in an atomized condition mingled with air into said auxiliary tank, a layer of filtering material in the latter through which the water passes, and a delivery-pipe leading the water thus reoxygenated and filtered, from the auxiliary tank to the exhibiting-tank to be again used, all combined and arranged to serve substantially as herein specified.

3. In an aquarium, an exhibiting-tank and an auxiliary tank, an injector adapted to draw water from the exhibiting-tank and force it in an atomized condition mingled with air into said auxiliary tank, a temperature-coil in the latter, around which the water passes, and a delivery-pipe leading the water thus reoxygenated and tempered, from the auxiliary tank to the exhibiting-tank to be again used, all combined and arranged to serve substantially as herein specified.

4. In an aquarium, an exhibiting-tank and an auxiliary tank, an injector adapted to draw water from the former and force it into the latter in an atomized condition mingled with air, in combination with a temperature-coil in said auxiliary tank, and a thermostat operated by the water in the said auxiliary tank and governing the flow through said coil, all substantially as herein specified.

5. In an aquarium, an exhibiting-tank and an auxiliary tank, an injector adapted to draw water from the former and force it into the latter in an atomized condition mingled with air, in combination with a temperature-coil in said auxiliary tank, a thermostat operated by the water in the said auxiliary tank and governing the flow through said coil, and a layer of filtering material in said auxiliary tank, all substantially as herein specified.

6. The exhibiting-tank A, and auxiliary tank B, in combination with the injector C, air-pipe F, suction-pipe G and its sleeve $g$, and the delivery-pipe K, all substantially as herein specified.

7. The exhibiting-tank A, and auxiliary tank B, in combination with the injector C, air-pipe F, suction-pipe G, temperature-coil D and its governing-thermostat T, plate E and filtering material $x$ thereon, all substantially as herein specified.

In testimony that I claim the invention above set forth I affix my signature in presence of two witnesses.

PETER SMITH.

Witnesses:
ROBT. CONNOR,
GEO. W. CASE, Jr.